United States Patent
Moriwaki et al.

(10) Patent No.: US 8,406,222 B2
(45) Date of Patent: Mar. 26, 2013

(54) CONTROL SYSTEM OF COMMUNICATION NETWORK

(75) Inventors: Tetsuro Moriwaki, Saitama (JP); Keiichi Hibi, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 1820 days.

(21) Appl. No.: 11/658,581

(22) PCT Filed: Jul. 26, 2005

(86) PCT No.: PCT/JP2005/013669
§ 371 (c)(1),
(2), (4) Date: Jan. 26, 2007

(87) PCT Pub. No.: WO2006/011493
PCT Pub. Date: Feb. 2, 2006

(65) Prior Publication Data
US 2008/0310611 A1    Dec. 18, 2008

(30) Foreign Application Priority Data
Jul. 30, 2004    (JP) .................................. 2004-223609

(51) Int. Cl.
H04L 12/66 (2006.01)
H04W 4/00 (2009.01)
H04W 36/00 (2009.01)
H04M 3/42 (2006.01)

(52) U.S. Cl. ........ 370/352; 370/353; 370/354; 370/355; 370/356; 370/328; 370/329; 370/331; 379/211.01; 379/212.01; 455/436; 455/439; 455/442

(58) Field of Classification Search .......... 370/328–338, 370/352–356; 379/211.01, 212.01; 455/422.1, 455/436–444; 709/204–207
See application file for complete search history.

(56) References Cited

U.S. PATENT DOCUMENTS
(Continued)

FOREIGN PATENT DOCUMENTS
JP    2001-309059 A    11/2001
JP    2002-209272 A    7/2002
(Continued)

OTHER PUBLICATIONS
Takayuki Warabino et al., Information Processing Society of Japan Kenkyu Hokoku, vol. 2003, No. 114, pp. 105 to 112.
(Continued)

*Primary Examiner* — Asad Nawaz
*Assistant Examiner* — Kai Chang
(74) *Attorney, Agent, or Firm* — Birch, Stewart, Kolasch & Birch, LLP

(57) ABSTRACT

A smooth and seamless terminal switching guaranteeing continuity of communication at an application level is realized. A call control part for setting and managing a physical and logical transmission path between communication terminals, a session management part for managing establishment of data communication between the communication terminals, and a switching request processing unit for controlling interruption and resumption of a session are provided, wherein the switching request processing unit exercises a function to temporarily interrupt a session after receiving a session switching request signal from a communication terminal, a function to instruct the call control part to establish a call connection with a switch destination communication terminal, a function to establish a session with an application on the switch destination communication terminal, and a function to resume, after establishing the session, a session with a communication terminal of an opposite side.

16 Claims, 7 Drawing Sheets

U.S. PATENT DOCUMENTS

| | | | |
|---|---|---|---|
| 6,853,718 B1 * | 2/2005 | Bedingfield et al. | 379/212.01 |
| 6,888,808 B2 * | 5/2005 | Jagadeesan et al. | 370/328 |
| 7,106,848 B1 * | 9/2006 | Barlow et al. | 379/212.01 |
| 7,171,221 B1 * | 1/2007 | Amin et al. | 455/462 |
| 8,107,609 B2 * | 1/2012 | Trandal et al. | 379/210.01 |
| 2003/0174670 A1 * | 9/2003 | Mar et al. | 370/328 |
| 2004/0028009 A1 * | 2/2004 | Dorenbosch et al. | 370/329 |
| 2004/0044721 A1 * | 3/2004 | Song et al. | 709/202 |
| 2006/0121894 A1 * | 6/2006 | Ganesan | 455/432.1 |
| 2006/0121916 A1 * | 6/2006 | Aborn et al. | 455/456.5 |
| 2010/0157882 A1 * | 6/2010 | Moriwaki et al. | 370/328 |

FOREIGN PATENT DOCUMENTS

| | | | |
|---|---|---|---|
| JP | 2003-70042 A | 3/2003 |
| JP | 2004-336310 A | 11/2004 |
| JP | 2004-362062 A | 12/2004 |
| JP | 2005-57397 A | 3/2005 |

OTHER PUBLICATIONS

Ken'ichi Yamazaki et al., NIT DoCoMo Technical Journal, vol. 10, No. 4, Jan. 1, 2003, pp. 24 to 28.

Takao Nakanishi et al., NTT R&D, vol. 52, No. 3, Mar. 10, 2003, pp. 223 to 230.

Yabusaki et al., NTT DoCoMo Technical Journal vol. 10, No. 4, Jan. 2003, pp. 6 to 34.

Imai et al., Collection of Drafts for the Fourth Symposium on YRP Mobile Communications for Exchange of Industry, Academia and Government, 2002, pp. 112 to 113.

Keneko et al., Collection of Drafts for the Fourth Symposium on YRP Mobile Communications for Exchange of Industry, Academia and Government, 2002, pp. 114 to 115.

* cited by examiner

CONTROL SYSTEM OF COMMUNICATION NETWORK

TECHNICAL FIELD

The present invention relates to a control technology of a communication network providing mobile communication services, and more particularly to a control system of a communication network having a seamless terminal switching function that can continue a communication without interruption even when a user switches a terminal in use to another terminal during communication.

BACKGROUND ART

In recent years, with rapid proliferation of network services typified by the Internet and mobile phones, realization of more advanced communication services is expected. A so-called handover function and a mobility management function that allows continuity of communication when a user moves while carrying a terminal have been provided for the mobile phones, and by further developing and enhancing such functions, realization of, for example, a function is demanded that can allow continuity of communication even if the terminal is switched during communication.

As a communication network expands and develops to enable connection of various terminals to the network, a user will tend to have various kinds of communication terminals that can connect to the communication network. It is expected that these communication terminals include not only portable terminals such as mobile phones, but also stationary apparatuses installed in homes such as television sets, which are expected to work also as communication terminals.

On a communication network side, on the other hand, by providing a common IP backbone making use of an IP (Internet Protocol) communication technology constructed with the development of the Internet, it becomes easier to enjoy services common to various kinds of communication terminals without being aware of differences in access means such as wireless and cables, network operators, and service providers.

Under such circumstances, a user freely uses different communication terminals owned by the user such as a mobile communication terminal, a PDA, and a personal computer for different purposes depending on user's situation and the like and even if the same service is used, a desire naturally arises to use the service using a terminal carried or selected by the user at that point. Moreover, there is assumed a situation where a terminal be preferably switched to another terminal during communication. In such a situation, a user's desire to seamlessly switch to another terminal without interruption while maintaining a communication state, instead of once disconnecting a communication and establishing another connection from another terminal, needs to be realized. More specifically, there is the case in which image content by streaming delivery has been viewed on a personal computer at home and when going out, a receiving terminal is switched to a mobile communication terminal or PDA to continue to view the same content on the terminal to be carried outside. Also the case can be considered in which, since a user gets home while communicating with an opposite party with a TV phone, the communication with the opposite party with the TV phone is continued by switching to the TV set at home.

To realize a seamless terminal switching as described above, when receiving multicast delivery, a terminal switching can be realized relatively easily because data of the same content is simultaneously delivered to a plurality of (unspecified number of) communication terminals from a terminal on a transmitting side and a terminal of switch destination needs only to connect to the terminal on the transmitting side so that the data is also received by the relevant receiving terminal.

However, in the case of unicast delivery in which content is delivered to specific terminals or one-to-one communication, a procedure is needed which instructs a terminal on the transmitting side to once suspend a communication and, connects a terminal of switch destination to the terminal on the transmitting side, and then resumes the communication after notifying that the terminal on a receiving side has been switched.

FIG. 6 shows an example of terminal switching in a conventional control system of a communication network. The example in FIG. 6 shows the case in which a user switches a communication terminal #1 currently in use for communication to a communication terminal #2. First, the user sends control information denoted by an arrow 101 from the communication terminal #1 currently receiving data to a server apparatus X on the delivery side to instruct to suspend the delivery. Next, control information denoted by an arrow 102 that requests to disconnect communication connection to the server apparatus X is sent to a control apparatus Y in the communication network to disconnect the communication. Then, when the user sends out a connection request to the same server apparatus X as described above denoted by an arrow 103 from the communication terminal #2, which is a terminal of switch destination, to the control apparatus Y in the communication network, the control apparatus Y sets up a communication path between the communication terminal #2 and the server apparatus X in the communication network to set a connection between apparatuses concerned. Subsequently, when control information to instruct resumption of delivery denoted by an arrow 104 is sent out from the communication terminal #2 to the server apparatus X, the server apparatus X sends out data from a point where the delivery was suspended and the user can receive data to be continued using the communication terminal #2, which puts terminal switching in practice.

Here, address information of the server apparatus X needed for the communication terminal #2, which is the terminal of switch destination, to connect to the server apparatus X is specified in a format of a telephone number or URL by means of input through the user's operation of the communication terminal #2 or the like. In this example, the control apparatus Y in the communication network is in charge of only connection and disconnection between the communication terminal #1 or #2 and the server apparatus X and has no control function to switch terminals, and thus the terminal switching is realized by functions of the communication terminals and server apparatus to interrupt and resume a communication.

FIG. 7 shows an example of another conventional method of terminal switching. To perform terminal switching, the communication terminal #1 on the receiving side sends out, as denoted by an arrow 201, control information to the server apparatus X on a delivery side to instruct to suspend delivery. If, after holding a communication with the server apparatus X, a user performs a transfer operation, the communication terminal #1 sends out, as denoted by an arrow 202, control information to the control apparatus Y in the communication network to request to transfer a connection with the server apparatus X to the communication terminal #2. The control apparatus Y, which received the control information, originates a call to the communication terminal #2, as denoted by an arrow 203, by sending out control information to instruct to establish a connection to the server apparatus X to the communication terminal #2. When the communication terminal #2 answer the call, as denoted by an arrow 204, a connection is established by setting a communication path between the communication terminal #2 and the server apparatus X.

Subsequently, by transmission and reception of control information between the communication terminal #1, which is a transfer source, and the control apparatus Y, as denoted by an arrow 205, the connection between the communication terminal #1 and the server apparatus X is disconnected. At the same time, the communication terminal #2 sends out control information, denoted by an arrow 206, to request to resume the communication that has been put on hold to the server apparatus X to receive data to be continued. In this example, though the control apparatus Y in the communication network has a control function to transfer a call to another terminal, the control apparatus Y does not have functions to interrupt and resume data transmission/reception between the communication terminal and server apparatus so that continuity of communication, that is, a seamless switching is not guaranteed.

Non-Patent Document 1: "Special Feature: All-IP Mobile Network" by Yabusaki et al., NTT DoCoMo Technical Journal Vol. 10 No. 4 Jan. 2003, P. 6 to 34

Non-Patent Document 2: "Service Handoff Mechanism toward Realization of Ubiquitous Applications" by Imai et al., Collection of Drafts for the Fourth Symposium on YRP Mobile Communications for Exchange of Industry, Academia and Government, 2002, P. 112 to 113

Non-Patent Document 3: "Session Layer Mobility Support for Dynamic Network Services" by Kaneko et al., Collection of Drafts for the Fourth Symposium on YRP Mobile Communications for Exchange of Industry, Academia and Government, 2002, P. 114 to 115

DISCLOSURE OF THE INVENTION

However, in all conventional examples described above, when switching terminals, continuity is secured only by holding and resuming a communication between communication terminals and a server apparatus, that is, an end-to-end communication and there is no guarantee for seamless switching without interruption. In other words, a terminal switching is only seemingly realized by providing a function to hold a communication, that is, a data transmission in the server apparatus X and, after suspending the data transmission, requesting to resume the data transmission from another communication terminal. This can realize functions to some extent when delivering content stored in a server apparatus in one direction to communication terminals and when performing one-to-one bi-directional real-time communication such as a TV phone. However, if a high-level communication application has a state in accordance with transmission data, for example, when an online game is continued on another terminal or cooperative work to edit the same document while performing communication is done, there has been a problem that it is difficult to notify a terminal of switch destination of the state of the communication application.

Namely, even for services such as a TV phone and content delivery, there has been a problem that processing and procedures for switching to another terminal become complicated and troublesome when a plurality of communications (connections) are set between end-to-end applications such as applications using a lot of media simultaneously and those using various kinds of content/information in collaboration.

Further, there has also been a problem that it is difficult to provide a service in cooperation with communication network control so as to suitably control network service quality (bit rate, delay, and so on) in order to receive content in an optimum communication mode (bit rate, resolution, etc.) in accordance with terminal capabilities when switching terminals.

The present invention has been developed in consideration of the above circumstances and an object thereof is to provide an extensible and flexible control system of a communication network that solves the above problems by providing functions to transfer-calls for terminal switching and to manage and transfer sessions, which are logical data transmission paths between end-to-end applications, in a control unit within a communication network when a communication terminal on the receiving side currently receiving data is switched to another communication terminal, realizes a smooth and seamless terminal switching that guarantees continuity of communication at an application level, and is easy to cooperate with other management and control functions with which the communication network is provided, thereby easily realizing an advanced high-function communication service.

Another object of the present invention is to realize a control system of a communication network that can realize a terminal switching while maintaining relevant states and provide various kinds of advanced applications and communication services without making processing in communication terminals and a server apparatus more complicated even in applications that require complicated communication modes and complicated state management by providing a function to notify a communication terminal of switch destination of states of sessions and applications from a communication terminal before switching or a control apparatus within a communication network.

(1) To achieve the above objects, the present invention has taken the following steps. That is, a control system of a communication network according to the present invention is a control system (10) of a communication network performing control to continue a communication without interrupting the communication between communication terminals by switching at least one communication terminal performing the communication to another communication terminal not performing the communication, the control system comprises: a call control means (171*a*) for setting and managing a physical and logical transmission path between the communication terminals by performing a routing control of data packet transfer in a transport layer; a session management means (172) for managing establishment of data communication between applications of the communication terminals on the transmission path; and a switching request processing means (181) for controlling interruption and resumption of a session by managing state of the session, wherein the switching request processing means (181) exercises: a function (181*a*, 181*b*) to receive a session switching request signal from the communication terminal to temporarily interrupt a session; a function (181*a*, 181*c*) to instruct the call control means (171*a*) to establish a call connection to a communication terminal of switch destination, a function (181*a*, 181*d*) to establish a session with an application on a communication terminal of the switch destination, and a function (181*a*, 181*b*) to resume, after establishing the session, a session with a communication terminal of opposite side.

Since, in addition to the function to set and manage a transmission path of data in a communication network, the function to manage and control end-to-end sessions, that is, logical transmission paths between applications using transmitted data and the function to transfer the sessions are exercised, as described above, a smooth and seamless switching of communication terminals including up to state management of sessions and applications can be realized. Also, cooperation with other management and control functions with which the communication network is provided becomes easier and an advanced high-function communication service can thereby be realized more easily, improving extensibility and flexibility.

(2) Also, a control system of a communication network according to the present invention is a control system (10) of a communication network performing control to continue a communication without interrupting the communication between communication terminals by switching at least one communication terminal performing the communication to another communication terminal not performing the communication, the control system comprises: a call control means (171a) for setting and managing a physical and logical transmission path between the communication terminals by performing a routing control of data packet transfer in a transport layer; a session management means (172) for managing establishment of data communication between applications of the communication terminals on the transmission path; and a switching request processing means (181) for controlling interruption and resumption of a session by managing state of the session, wherein the session management means (172) exercises the function of managing terminal capability information including a type, attributes, processing and available bit rates, media type, and codec type of the communication terminal, and the switching request processing means (181) exercises: a function (181a, 181b) to receive a session switching request signal and the terminal capability information of a communication terminal of switch destination from the communication terminal to temporarily interrupt a session, a function (181a, 181d) to perform a control to, based on the received terminal capability information, change the transmission path and session with a communication terminal of opposite side to those dependent on the terminal capability, a function (181a, 181c) to instruct the call control means (171a) to establish a call connection to the communication terminal of switch destination, a function (181a, 181d) to establish a session with an application on the communication terminal of switch destination, and a function (181a, 181b) to resume, after establishing the session, a new session with the communication terminal of opposite side dependent on the terminal capability.

Since, in addition to the function to set and manage a transmission path of data in a communication network, the function to manage and control end-to-end sessions, that is, logical transmission paths between applications using transmitted data and the function to transfer the sessions are exercised, as described above, a smooth and seamless switching of communication terminals including up to state management of sessions and applications can be realized. Also, since the transmission path and session with the communication terminal of the opposite side are changed to ones in accordance with the terminal capabilities of the new terminal based on the terminal capability information, a smooth and seamless terminal switching guaranteeing continuity of communication at the application level based on quality and attributes of the terminal capabilities can be realized.

(3) Also, a control system of a communication network according to the present invention is a control system (10) of a communication network performing control to continue a communication without interrupting the communication between communication terminals by switching at least one communication terminal performing the communication to another communication terminal not performing the communication, the control system comprises: a call control means (171a) for setting and managing a physical and logical transmission path between communication terminals by performing a routing control of data packet transfer in a transport layer; a session management means (172) for managing establishment of data communication between applications of the communication terminals on the transmission path; and a switching request processing means (181) for controlling interruption and resumption of the session by managing state of the session, wherein the session management means (172) exercises a session state storage function (172a) to manage and storing session states including data transmission history and states of applications on the communication terminals, and the switching request processing means (181) exercises: a function (181a, 181b) to receive a session switching request signal from the communication terminal to temporarily interrupt a session, a function (181a, 181c) to instruct the call control means (171a) to establish a call connection to a communication terminal of switch destination, a function (181a, 181c) to establish a session with an application on the communication terminal of switch destination, a function (181a, 181d) to notify the communication terminal of switch destination of information on data transmission history and session state including state of application on the communication terminal held by the session state storage function (172a) when establishing the session, and a function (181a, 181b) to resume, after establishing the session, a session with a communication terminal of an opposite side.

Since, in addition to the function to set and manage a transmission path of data in a communication network, the function to manage and control end-to-end sessions, that is, logical transmission paths between applications using transmitted data and the function to transfer the sessions are exercised, as described above, a smooth and seamless switching of communication terminals including up to state management of sessions and applications can be realized. Also, since the terminal of switch destination is notified of information about session states including data transmission history and states of applications on the communication terminal held in the session state storage function of the control system when establishing a session with an application on the communication terminal of switch destination, there is no need for each communication terminal to manage information about session states locally and transmit the information to the control system. As a result, processing load at each communication terminal is lightened, enabling simplification of a terminal configuration and reduction of battery consumption.

(4) Also, in the control system of a communication network according to the present invention, the switching request processing means (181) comprises a determination function (181a, 181d, 181e) that determines whether to switch one of communication terminals performing the communication to another communication terminal not performing the communication based on traffic conditions in the communication network or resource conditions in a transmission portion, wherein the various functions are exercised when, as a result of the determination, one of the communication terminals performing the communication is switched to another communication terminal not performing the communication.

With such a configuration, whether to perform the communication with another communication terminal not performing the communication can be determined on a communication network side without transmitting a terminal switching request signal to the communication network from a communication terminal. For example, if a first communication terminal is a mobile communication terminal or the like whose data processing capabilities and transmission resources are restricted to some extent and a second communication terminal is a personal computer or the like whose data processing capabilities are higher and independent of transmission resources, a session can be transferred to the second communication terminal based on a determination of the communication network side. Also, the configuration may be used to transfer a session after confirming that sufficient transmission resources are available by checking use states, unused states and the like of traffic and transmission resources in a communication network.

(5) Also, in the control system of a communication network according to the present invention, the switching request processing means (181) comprises a media conversion control function (181*a*, 181*f*) part that controls conversion of a format of content data into a format adapted to reception capability of the communication terminal of switch destination when switching one of communication terminals performing the communication to another communication terminal not performing the communication, wherein a function (171*b*) to set routing control for transferring content data in a converted format to the communication terminal of switch destination is exercised.

Since the format of content data is converted into one adapted to reception capabilities of a communication terminal of switch destination, as described above, the data format is optimized for individual communication terminals by a control performed by the control system before transmission even if capabilities of communication terminals on the receiving side are different. As a result, load is imposed on neither a communication terminal side nor a server apparatus side. Also, it becomes easier to reflect communication network states such as conversion of a data format into one adjusted to transmission resources available in a communication network. This makes it possible to provide a seamless and ubiquitous service environment.

(6) A control method of a communication network according to the present invention is a control method of a communication network performing control to continue a communication without interrupting the communication between communication terminals by switching at least one communication terminal performing the communication to another communication terminal not performing the communication using a control system of the communication network having: a call control means for setting and managing a physical and logical transmission path between the communication terminals by performing a routing control of data packet transfer in a transport layer; a session management means for managing establishment of data communication between applications of the communication terminals on the transmission path; and a switching request processing means for controlling interruption and resumption of a session by managing states of the session, the control method comprises: a step (C401) in which at least one communication terminal performing the communication transmits a session switching instruction signal including information on session, states of communication applications and history to the communication terminal of switch destination not performing the communication, using a short range transmission means that does not pass through the communication network; a step (C403) in which the communication terminal that transmitted the session switching instruction signal transmits a session switching request signal to the control system of the communication network after receiving a response signal from the communication terminal of switch destination; and a step (C425) in which the control system of the communication network disconnects a call connection and session with the communication terminal before switching while establishing a call connection to the communication terminal of switch destination (C404 to C409) to establish a session with an application on the communication terminal of switch destination (C424).

Since, in addition to setting and management of a transmission path of data in a communication network, management and control of end-to-end sessions, that is, logical transmission paths between applications using transmitted data and transfer of the sessions are performed, as described above, a smooth and seamless switching of communication terminals including up to state management of sessions and applications can be realized. Also, cooperation with other management and control functions with which the communication network is provided becomes easier and an advanced high-function communication service can thereby be realized more easily, improving extensibility and flexibility. Further, by notifying a communication terminal of switch destination of transfer of a session in advance and confirming it, a smooth and reliable switching can be realized such as making preparations for receiving the transferred session and not transferring a session when a communication terminal is occupied by other processing.

(7) Also, a control method of a communication network according to the present invention is a control method of a communication network performing control to continue a communication without interrupting the communication between communication terminals by switching at least one communication terminal performing the communication to another communication terminal not performing the communication using a control system of the communication network having: a call control means for setting and managing a physical and logical transmission path between the communication terminals by performing a routing control of data packet transfer in a transport layer; a session management means for managing establishment of data communication between applications of the communication terminals on the transmission path; and a switching request processing means for controlling interruption and resumption of a session by managing states of the session, the control method comprises:
a step (C401) in which at least one communication terminal performing the communication transmits a session switching instruction signal to a communication terminal of switch destination not performing the communication, using a short range transmission means that does not pass through the communication network; a step (C403) in which the communication terminal that transmitted the session switching instruction signal transmits a session switching request from to the control system of the communication network after receiving a response signal from the communication terminal of switch destination; and a step (C425) in which the control system of the communication network disconnects a call connection and session with the communication terminal before switching while establishing a call connection to the communication terminal of switch destination (C404 to C409) and transmitting a session establishment request signal including information on said session before switching, states of communication applications and history (C417) to establish a session with an application on said communication terminal of switch destination (C424).

Since, in addition to setting and management of a transmission path of data in a communication network, management and control of end-to-end sessions, that is, logical transmission paths between applications using transmitted data and transfer of the sessions are performed, as described above, a smooth and seamless switching of communication terminals including up to state management of sessions and applications can be realized. Also, since the control system of the communication network transmits information about sessions before switching, communication application states, and history to a communication terminal of switch destination, the communication terminal of switch destination can set the sessions and communication applications according to the received information. Continuity of communication is thereby guaranteed based on quality and attributes before switching at the application level and, at the same time, even for applications that require a complicated communication mode or state management, a smooth and seamless terminal switching can be realized.

(8) Also, a control method of a communication network according to the present invention is a control method of a communication network performing control to continue a communication without interrupting the communication between communication terminals by switching at least one communication terminal performing the communication to another communication terminal not performing the communication using a control system of the communication network having: a call control means for setting and managing a physical and logical transmission path between the communication terminals by performing a routing control of data packet transfer in a transport layer; a session management means for managing establishment of data communication between applications of the communication terminals on the transmission path; and a switching request processing means for controlling interruption and resumption of a session by managing states of the session, the control method comprises: a step (C501) in which at least one communication terminal performing the communication transmits a session switching request to the control system of the communication network; and a step (C520) in which the control system of the communication network disconnects a call connection and session with the communication terminal before switching while transmitting a call connection request signal including information indicating to be a transferred call from a communication terminal before switching to establish a call connection with the communication terminal of switch destination (C502 to C505) and transmitting a session establishment request signal including information indicating to be a session transferred from the communication terminal before switching and information on the session before switching, states of communication applications and history (C511) to establish a session with an application on the communication terminal of switch destination (C519).

Since, in addition to setting and management of a transmission path of data in a communication network, management and control of end-to-end sessions, that is, logical transmission paths between applications using transmitted data and transfer of the sessions are performed, as described above, a smooth and seamless switching of communication terminals including up to state management of sessions and applications can be realized. Also, since the control system of the communication network transmits information indicating to be a transferred call from a communication terminal before switching when establishing a call connection to a communication terminal of switch destination, and transmits information indicating to be sessions transferred from the communication terminal before switching and information about sessions before switching, communication application states, and history when establishing a session with an application on the communication terminal of switch destination, the communication terminal of switch destination can respond to a call connection or a session connection after recognizing a transferred call or transferred session from the communication terminal before switching respectively. Further, since the control system of the communication network transmits information about sessions before switching, communication application states, and history to the communication terminal of switch destination, the communication terminal of switch destination can set sessions and applications according to the received information. Continuity of communication is thereby guaranteed based on quality and attributes before switching at the application level and, at the same time, even for applications that require a complicated communication mode or state management, a smooth and seamless terminal switching can be realized.

(9) A communication terminal according to the present invention is a communication terminal (192) that performs communication via a control system of a communication network having: a call control means (171a) for performing a routing control of data packet transfer in a transport layer to set and manage a physical and logical transmission path between communication terminals; a session management means (172) for managing establishment of data communication between applications of the communication terminals on the transmission path; and a switching request processing means (181) for controlling interruption and resumption of a session by managing states of the session, the communication terminal comprises: a call connection means (192a) for requesting the control system (10) of the communication network to establish a call connection with a communication terminal of an opposite side; a session connection means (192b) for requesting the control system (10) of the communication network to set a session with an application on the communication terminal of the opposite side; a session management means (192c) for managing states of sessions and applications, and a short range transmission means (192d) for transmitting a session switching instruction signal including information on states of sessions and applications managed by the session management means to the communication terminal of switch destination without passing through the communication network when switching to another communication terminal not performing communication without interrupting the communication with the communication terminal of the opposite side, wherein the session switching instruction signal is transmitted by the short range transmission means (192d) and, after receiving a response signal from the communication terminal of switch destination, the session connection means (192b) transmits a session switching request signal to the control system (10) of the communication network.

Since the short range transmission means transmits a session switching instruction signal including information about states of sessions and applications managed by the session management means to a communication terminal of switch destination without passing through the communication network when switching, without interrupting the communication with the communication terminal of an opposite side, to another communication terminal not performing the communication and, after receiving a response signal from the communication terminal of switch destination, the session connection means transmits a session switching request signal to the control system of the communication network, as described above, a smooth and seamless switching of communication terminals including up to state management of sessions and applications can be realized.

(10) Also, a communication terminal according to the present invention is a communication terminal (192) that performs communication via a control system (10) of a communication network having: a call control means (171a) for performing a routing control of data packet transfer in a transport layer to set and manage a physical and logical transmission path between communication terminals; a session management means (172) for managing establishment of data communication between applications of the communication terminals on the transmission path; and a switching request processing means (181) for controlling interruption and resumption of a session by managing states of the session, the communication terminal comprises: a call connection means (192a) for requesting the control system (10) of the communication network to establish a call connection with a communication terminal of an opposite side; a session connection means (192b) for requesting the control system (10) of the communication network to set a session with an application on the communication terminal of the opposite side; and a session management means (192c) for managing states of sessions and applications, wherein the session connection means (192b) transmits a session switching request signal including information on states of sessions and applications managed by the session management means (192c) to the control system (10) of the communication network when switching to another communication terminal not performing communication without interrupting the communication with the communication terminal of the opposite side.

Since the session connection means transmits a session switching request signal including information about states of sessions and applications managed by the session management means to the control system of the communication network when switching, without interrupting the communication with a communication terminal of an opposite side, to another communication terminal not performing the communication, as described above, a smooth and seamless switching of communication terminals including up to state management of sessions and applications can be realized.

(11) Also, a communication terminal according to the present invention is a communication terminal (192) that performs communication via a control system (10) of a communication network having: a call control means (171a) for performing a routing control of data packet transfer in a transport layer to set and manage a physical and logical transmission path between communication terminals; a session management means (172) for managing establishment of data communication between applications of the communication terminals on the transmission path; and a switching request processing means (181) for controlling interruption and resumption of a session by managing states of the session, the communication terminal comprises: a call connection means (192a) for transmitting/receiving control information to/from the control system (10) of the communication network to process a call connection with a communication terminal of an opposite side; a session connection means (192b) for processing a setting of a session with an application on the communication terminal of the opposite side with the control system (10) of the communication network; a state setting means (192e) for receiving information indicating states of sessions and applications to set states of sessions and applications on an own communication terminal; and a short range transmission means (192d) for receiving a session switching instruction signal from another communication terminal without passing through the communication network, wherein, when the communication being performed by the other communication terminal is switched to the own communication terminal, the short range transmission means (192d) receives a session switching instruction from a communication terminal before switching, the state setting means (192e) sets states of sessions and applications based on information on states of sessions and applications included in the session switching instruction, and the session connection means (192b) receives a session switching request signal from the control system of the communication network to establish a session.

Since, when switching a communication being performed by another communication terminal to the own communication terminal, the short range transmission means receives a session switching instruction from a communication terminal before switching, the state setting means sets states of sessions and applications based on information about states of sessions and applications included in the session switching instruction, and the session connection means receives a session switching request signal from the control system of the communication network to establish a session, as described above, a smooth and seamless switching of communication terminals including up to state management of sessions and applications can be realized. Further, by notifying a communication terminal of switch destination of transfer of a session in advance and confirming it, a smooth and reliable switching can be realized such as making preparations for receiving the transferred session and not transferring a session when a communication terminal is occupied by other processing.

(12) Also, a communication terminal according to the present invention is a communication terminal (192) that performs communication via a control system (10) of a communication network having: a call control means for performing a routing control of data packet transfer in a transport layer to set and manage a physical and logical transmission path between communication terminals; a session management means for managing establishment of data communication between applications of the communication terminals on the transmission path; and a switching request processing means for controlling interruption and resumption of a session by managing states of the session, the communication terminal comprises: a call connection means (192a) for transmitting/receiving control information to/from the control system (10) of the communication network to process a call connection with a communication terminal of an opposite side; a session connection means (192b) for processing a setting of a session with an application on the communication terminal of the opposite side with the control system (10) of the communication network; and a state setting means (192e) for receiving information indicating states of sessions and applications to set states of sessions and applications on an own communication terminal, wherein, when the communication being performed by another communication terminal is switched to the own communication terminal, the call connection means (192a) and the session connection means (192b) receive a call connection instruction signal and a session switching instruction signal respectively from the control system (10) of the communication network, the state setting means (192e) sets states of sessions and applications based on information on states of sessions and applications included in the session switching instruction signal, and the call connection means (192a) and the session connection means (192b) establish a call connection and a session.

Since, when switching a communication being performed by another communication terminal to the own communication terminal, the call connection means and the session connection means receive a call connection instruction signal and a session switching instruction signal respectively from the control system of the communication network, the state setting means sets states of sessions and applications based on information about states of sessions and applications included in the session switching instruction signal, and the call connection means and the session connection means establish a call connection and a session, as described above, a smooth and seamless switching of communication terminals including up to state management of sessions and applications can be realized. Also, the communication terminal of switch destination (own communication terminal) can respond to a call connection or a session connection after recognizing a transferred call or a transfer session to come from a communication terminal before switching respectively. Since the control system of the communication network transmits information about session and communication application states before switching, and history to the communication terminal of switch destination (own communication terminal), the communication terminal of switch destination (own communication terminal) can set sessions and communication applications according to the received information. Continuity of communication is thereby guaranteed based on quality and attributes before switching at the application level and, at the same time, even for applications that require a complicated communication mode or state management, a smooth and seamless terminal switching can be realized.

According to the present invention, a user can realize a switching of communication terminals to be used by a simple button operation or the like when requesting a switching in response to change of the user's environments while significantly reducing operational trouble and time loss compared with conventional art so that more advanced services can be enjoyed. Moreover, a server apparatus on the delivery side can advantageously continue a delivery service without specially installing a new function. Further, since the data format is optimized for individual communication terminals by a control performed by a service control layer before transmission even if capabilities of communication terminals on the receiving side are different, there is an advantage that load is imposed on neither communication terminals nor server apparatus. By providing commonality of such a service provision infrastructure, a user can enjoy a seamless and ubiquitous service environment without being aware of differences of conventional wire/wireless network services, communication terminal types and the like.

BEST MODES FOR CARRYING OUT THE INVENTION

Figure 1:
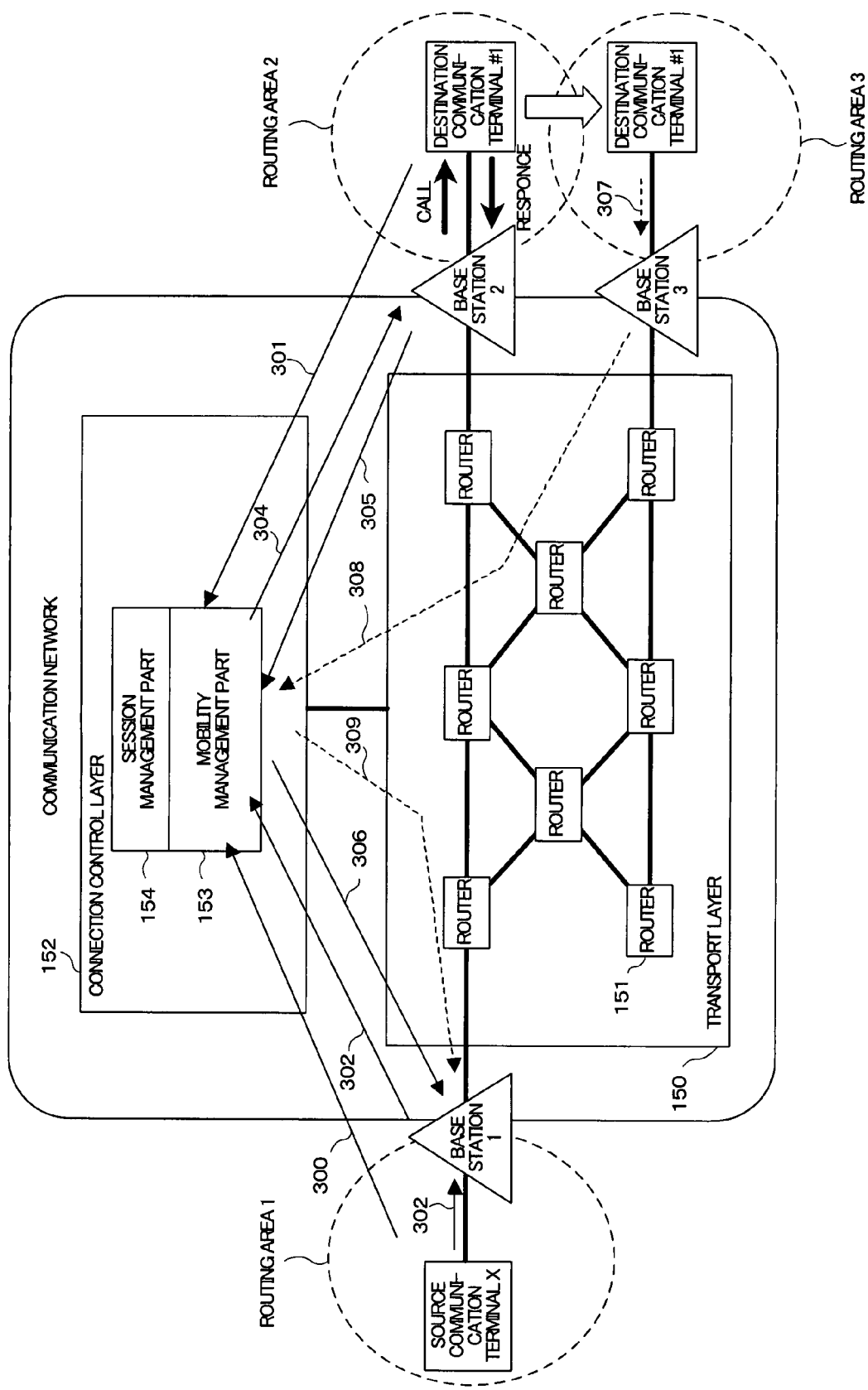
FIG. 1 is a diagram showing a basic control method of handover.

A control system of a communication network according to the present invention exercises, in addition to a function to set and manage a transmission path of data in the communication network, the function to manage and control end-to-end sessions, that is, logical transmission paths between applications using transmitted data and the function to transfer the sessions. With these functions, a smooth and seamless switching of communication terminals including up to state management of sessions and applications can be realized.

Also, the communication terminal according to the present invention exercises the function to make notification of states of sessions and applications and the function to set, based on the notified states, the sessions and applications to the relevant states for resumption. With these functions, a smooth and seamless terminal switching is realized while maintaining session states adequately.

Further, by utilizing handover and mobility management functions provided in a mobile communication network that appropriately switch a transmission path following changes of communication terminal locations and address information and linking these functions to the session management function, the function to set the transmission path when switching communication terminals is realized with a minimum change of conventional art. Then, the session management function with high flexibility and extensibility is realized.

In a next-generation mobile communication network, it is assumed that an all IP based platform is constructed and used in which all data is transmitted and exchanged in a form of IP packets. Also, a so-called call-control separated architecture in which the function for data transmission and the control function such as a call setup and routing management are clearly separated is currently being studied. In this architecture, speed improvement and higher efficiency in an entire system are sought by configuring the system such that a transport layer as the lower-layer is dedicated to the function of transmitting data, that is, IP packets efficiently at high speed, functions such as routing control and traffic control are assigned to a connection control layer, and instructions such as routing and resource allocation are given from the connection control layer to the transport layer. In an all IP based platform, it is assumed that control signals such as call control and signaling are also transmitted in the form of IP packets.

Moreover, in the all IP based architecture, provision of a service support function is currently being studied so that various communication services can be provided flexibly and freely by making a network more advanced and increasing added-value. This means that, while a call control function that sets an end-to-end physical and logical transmission path was a core in a previous network with a focus on a voice call, in a next-generation network, the function of a session control, which is a logical connection between end-to-end communication applications, is provided in the network. Here, a call or a call connection indicates a physical and logical path (that path is set) for transmitting data to an opposite party between end-to-end terminals and a session indicates that a communication application on a terminal is in a state of being able to receive and process (or processing) data from an application on a terminal of an opposite party of communication. That is, a state in which data can be transmitted/received to/from the opposite terminal, but which application to use is either not determined or not prepared is a state in which a call connection is established, but no session is connected. Conversely, a state in which an application is ready for transmitting/receiving data, but data transmission paths are lost (for example, a mobile phone moves out of service area) is a state in which a session is connected, but no call connection is established.

Further, in a mobile communication network, a transmission path switching control of routers that transmit IP packets while maintaining the call connection and session connection with movement of mobile phones and changes in accommodated base stations, or so-called handover control is performed.

Figure 2:
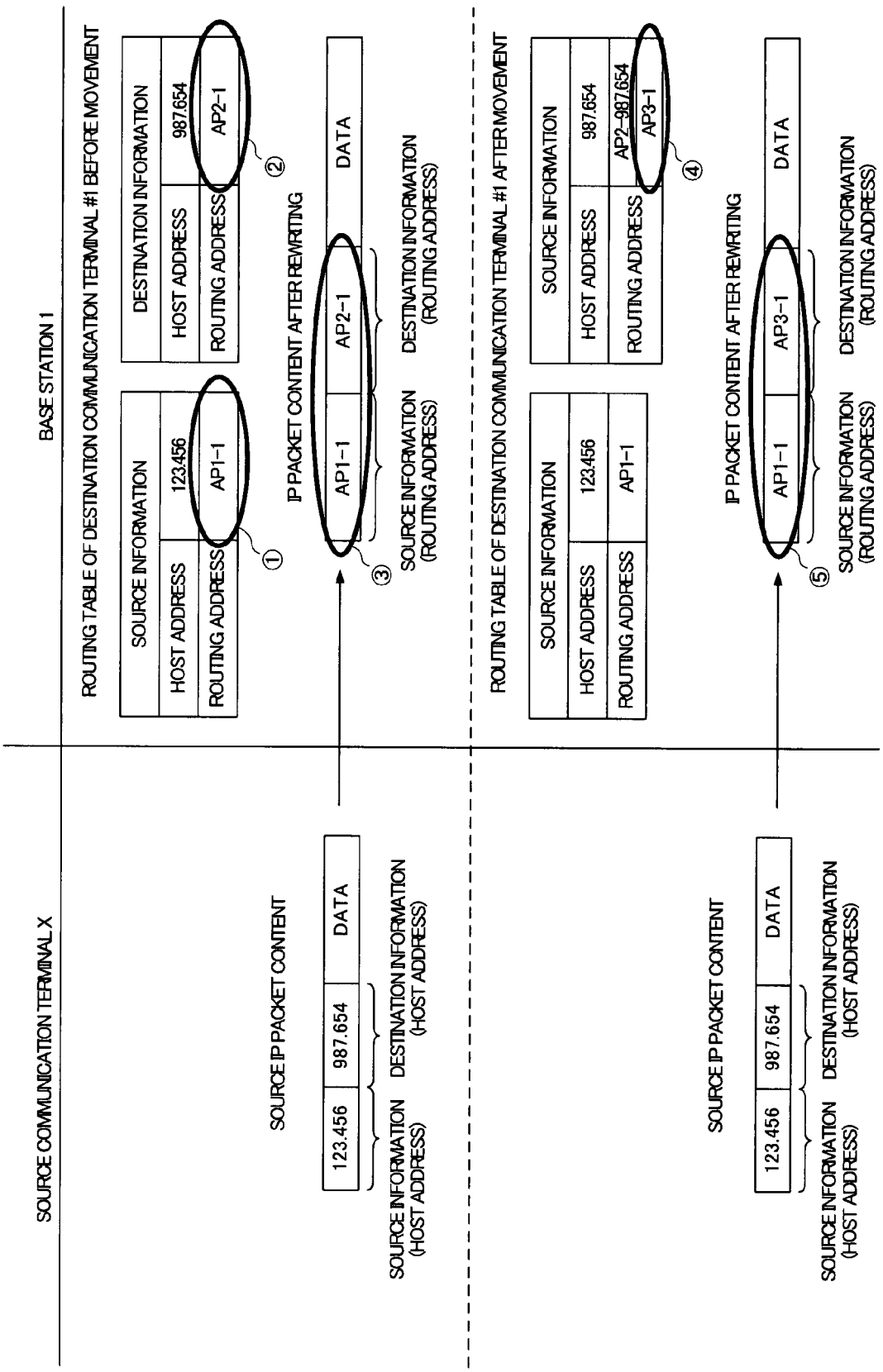
FIG. 2 is a diagram showing changes of routing information contained in an IP packet during handover.

FIG. 1 is a diagram showing a setting procedure, after a source communication terminal X sets a call connection with a communication terminal #1, which is a communication destination, and the communication terminal X starts delivery of IP packets, until the communication terminal #1 becomes ready for a session, and a basic control method of handover when the communication terminal #1 subsequently moves while maintaining the call connection and session. FIG. 2 is a diagram showing changes of routing information contained in IP packets during handover.

Before starting communication, the communication terminal X located near a base station 1 in FIG. 1 sends out, based on a host address such as a telephone number representing an identity of its own, control information for location registration to a mobility management part 153 of a connection control layer 152 via each router 151 in a transport layer 150 with the base station 1 as a starting point, as shown by an arrow 300. The mobility management part 153 uses a location management function to grasp that the communication terminal X is located within a routing area 1, which is a physical range under control of the base station 1 represented by a dotted line circle in FIG. 1, because control information of its location registration is sent out from the base station 1. Similarly, the mobility management part 153 also uses the location management function to grasp that the communication terminal #1 to be an opposite party of the communication, is located in a routing area 2 because its location is registered in the mobility management part 153 from a nearby base station 2 via each router 151, as shown by an arrow 301.

For the communication terminal X to start communication with the communication terminal #1, first, control information requesting a call setup is sent out, as shown by an arrow 302, to the base station 1, which controls the routing area in which the communication terminal X is located, by specifying the host address such as the telephone number of the communication terminal #1 of the destination through a button operation or the like of the communication terminal X by a user. After receiving a call setup request, the base station 1 associates the call setup request with the host address of the communication terminal X, assigns a routing address, which is path information, to the communication terminal X, holds the routing address in a routing table of its own, as shown inside a circle 1 in FIG. 2, registers the routing address in the mobility management part 153 via each router 151 in the transport layer 150 in FIG. 1, and further sends out control information 302 of the call setup request including the host address of the destination.

Knowing already the routing area in which the communication terminal #1 of the destination is located through the procedure of location registration, the mobility management part 153 sends out control information shown by an arrow 304 by the call control function to the base station controlling the routing area, that is, the base station 2 in FIG. 1 to instruct a call origination and the base station 2 sends out a call setup request to the communication terminal #1, as shown by a thick arrow.

When the communication terminal #1 makes a call response to the base station 2, as shown by a thick arrow, a call connection is set, and the base station 2 assigns a routing address to the communication terminal #1, holds the routing address in the routing table of its own, and registers the routing address in the mobility management part 153 via control information shown by an arrow 305 in FIG. 1.

When the mobility management part 153 notifies the base station 1, which has made a call request, of the routing address of the communication terminal #1 using a routing control function via control information represented by an arrow 306, the routing address is registered in the routing table of the base station 1 as destination information, as shown inside a circle 2 in FIG. 2, and hereafter, the base station 1 refers to the routing table to rewrite the source and destination host addresses described in a header part of IP packets sent out from the source communication terminal X to the destination communication terminal #1 to the routing addresses registered as described above respectively, as shown inside a circle 3, and thus IP packets are made to be transferable to the destination communication terminal #1 through each router in the transport layer based on the routing addresses and an end-to-end call connection is established so that communication can be started. Such a series of call connection processing is performed under control of a session management part 154. That is, the session management part 154 manages and grasps call connection and communication states between the communication terminal X and communication terminal #1.

As long as the destination communication terminal #1 is located within the routing area 2, as described above, the above routing address can be used, but if the communication terminal #1 moves to a routing area 3, as shown by a white arrow in FIG. 1, IP packets cannot be made to reach the destination communication terminal #1 using the above routing address and thus the session cannot be maintained. Consequently, when the communication terminal #1 moves to the routing area 3, control information for notification of the movement is sent out to a base station 3 controlling the routing area 3, as shown by a dotted arrow 307 from the communication terminal #1.

When the base station 3 assigns a new routing address to the communication terminal #1 and registers the new routing address in the mobility management part 153 via control information shown by a dotted arrow 308 in FIG. 1, the mobility management part sends out control information shown by a dotted arrow 309 to notify the base station 1, which is the nearby base station of the source communication terminal X, of the new routing address. The base station 1 updates information in the routing table, as shown inside a circle 4 in FIG. 2, and hereafter refers to the updated routing table to rewrite the header part of IP packets sent out from the communication terminal X to the new routing address, as shown inside a circle 5 in FIG. 2, to enable each router in the transport layer to transfer IP packets to the destination of the communication terminal #1. Though routing addresses of communication terminals change with this handover control, the session management part 154 in the connection control layer in FIG. 1 manages end-to-end session states and enables seamless communication by ensuring that sessions are managed and maintained consistently independent of routing address changes.

So far, the description has centered on the call connection. Though a call connections and a session are not particularly distinguished in a conventional voice call, in a multimedia communication and a data communication, a session is set between applications of communication terminals on end-to-end established transmission path after setting a call connection. This is performed when an application on the communication terminal X sends out a session setting request to an application on the communication terminal #1 via the session management part 154. The session management part 154 can thereby manage and grasp session states.

The description so far has mainly focused on the location management function, call control function, and routing control function in the connection control layer 152, and the transport layer 150, but as described above, inclusion of a session control function in a network is currently being considered for a next-generation mobile communication network. This is because it is becoming necessary to provide functions such as connection control and communication control from the network in accordance with various communication configurations, modes, media, and the like accompanying diversification and advancement of communication. When, for example, making a call to an opposite party by specifying whether it is a voice-only call or a TV phone, and quality and terminal capabilities such as resolution in the TV phone and a bit rate, functions insufficient through end-to-end negotiations such as address resolution for specifying terminals conforming to such requirements and settings (call control, routing control) of transmission paths in suitable quality must be realized by network capabilities.

Consequently, a control unit having the session control function is provided to manage and control sessions, that is, communication states, modes, and the like between end-to-end applications and, at the same time, is configured to instruct and control the call control function and routing control function of the mobility management part from the session control function to set transmission paths in suitable bands and quality. At this point, a connection request (session setting request) from an application of a communication terminal will be sent to the session control function for processing.

Figure 3:
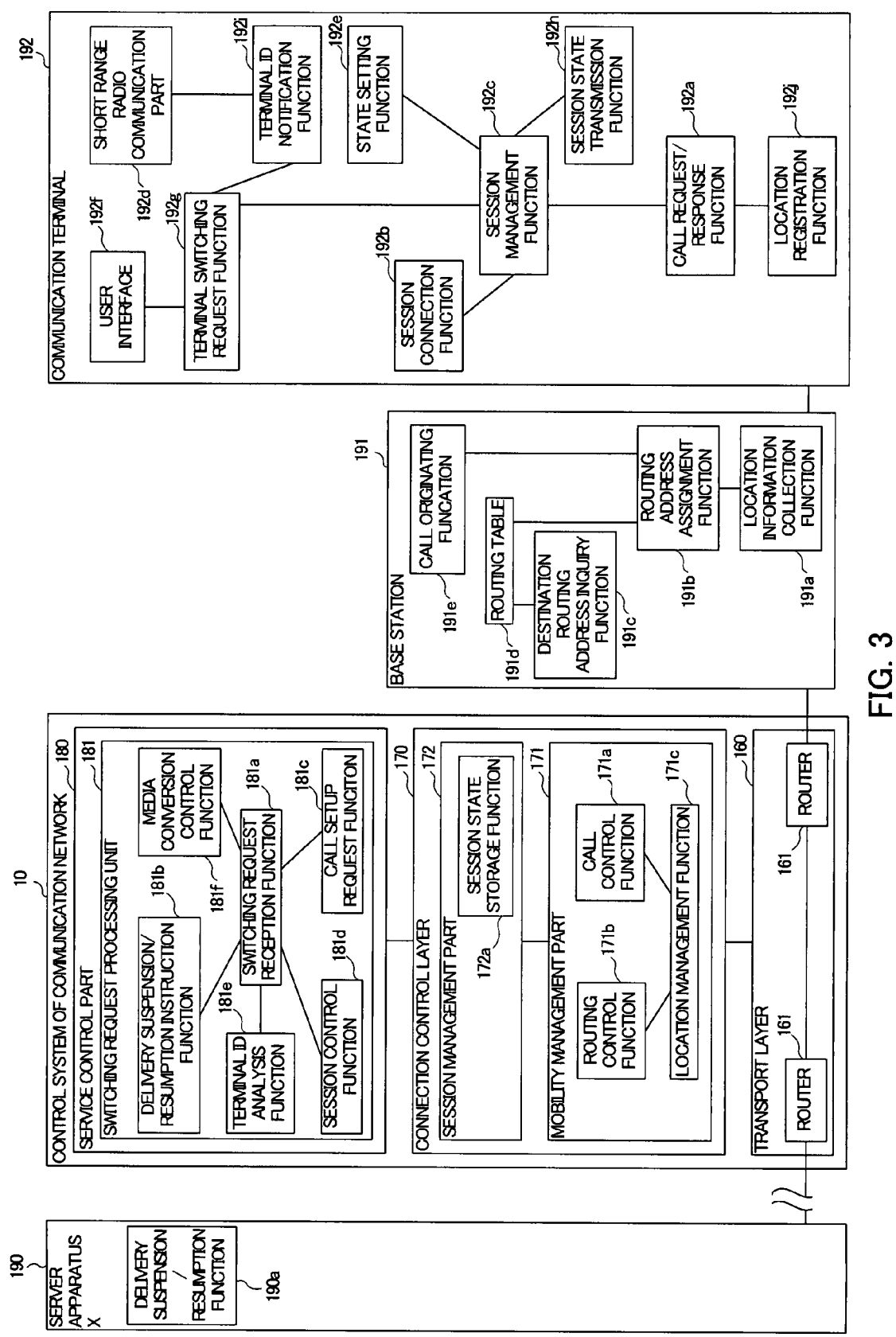
FIG. 3 is a diagram showing an outline configuration of a control system of a communication network according to the present embodiment.

A control system of a communication network according to the present embodiment comprises, as shown in FIG. 3, a transport layer 160 comprised of routers 161 transferring IP packets, a connection control layer 170 controlling the transport layer 160, and a still higher-level service control layer 180. The connection control layer 170 exercises a call control function 171a, a routing control function 171b, and a location management function 171c in a mobility management part 171 to perform management of physical locations of communication terminals described above, call control, and handover control (routing control). The connection control layer 170 also exercises a session state storage function 172a in a session management part 172 to maintain and manage sessions. The connection control layer 170 is thus in charge of control required for performing communication.

The service control layer 180 comprises a switching request processing part 181 that exercises a switching request reception function 181a, a delivery suspension/resumption instruction function 181b, a call setup request function 181c, a session control function 181d, and a terminal ID analysis function 181e. Then, the service control layer 180 is in charge of dealing with high-level requests of users such as switching communication terminals while maintaining a sessions by controlling and instructing the connection control layer 170.

Also in FIG. 3, a server apparatus 190 has a delivery suspension/resumption instruction function 190a. A base station 191 exercises a location information collection function 191a, a routing address assignment function 191b, and a destination routing address inquiry function 191c. The base station 191 also has a routing table 191d used for these functions, and exercises a call originating function 191e. A communication terminal 192 exercises a call request/response function 192a, a session connection function 192b to make a request of setting a session with an application on an opposite communication terminal to a control system 10 of a communication network, and a session management function 192c to manage sessions. The communication terminal 192 also comprises a short range transmission part 192d using a radio communication such as an infrared ray, Bluetooth (registered trademark), and UWB whose realization is regarded as promising in the future, a wire communication such as USB or the like. Also, the communication terminal 192 exercises a state setting function 192e to set states of sessions and applications on an own communication terminal by receiving information indicating states of sessions and applications, and further comprises a user interface 192f configured of an image display device and an input device and exercises a terminal switching request function 192g, a session state transmission function 192h, a terminal ID notification function 192i, and a location registration function 192j.

Next, a procedure for switching communication terminals in the present embodiment will be described. Required steps in the procedure for switching communication terminals are: (1) transmitting a session switching instruction signal from a communication terminal #1 to a communication terminal #2 of switch destination, (2) transmitting a session switching request signal from the communication terminal #1 to a switching request processing part after the communication terminal #2 of switch destination responds, (3) establishing a call connection, (4) transmitting a session establishment request signal including session states to the communication terminal #2 of switch destination, and (5) establishing a session with the communication terminal #2 of switch destination after activating an application. Other steps, for example, steps C410 to C412 in FIG. 4 described later can be omitted.

In a seamless switching procedure of communication terminals in the present invention, session states, that is, application states must be held so that they can be inherited to the communication terminal of switch destination. Therefore, a procedure for transmitting and notifying information representing session states from the communication terminal #1 to the communication terminal #2 is necessary and notification of the session state information is realized by using step (1) or step (2) or both of them. That is, the notification is realized by a method of direct transmission/notification to the communication terminal #2 by including session state information in a session switching instruction signal from the communication terminal #1 or a method of indirect transmission/notification via the switching request processing part 181 by transmitting a session switching request signal including session state information from the communication terminal #1 to the switching request processing part and a session establishment request signal including session states from the switching request processing part to the communication terminal #2. Which of these methods to use or whether to use both methods is selected in advance and implemented in accordance with the configuration of communication system, implementation conditions and constraints, transmission resources, processing capabilities and transmission capabilities of communication terminals, amount and complexity of information to be transmitted as session state information, session contents and attributes, or an appropriate method is selected and performed each time communication terminals are switched and sessions are transferred.

Figure 4:
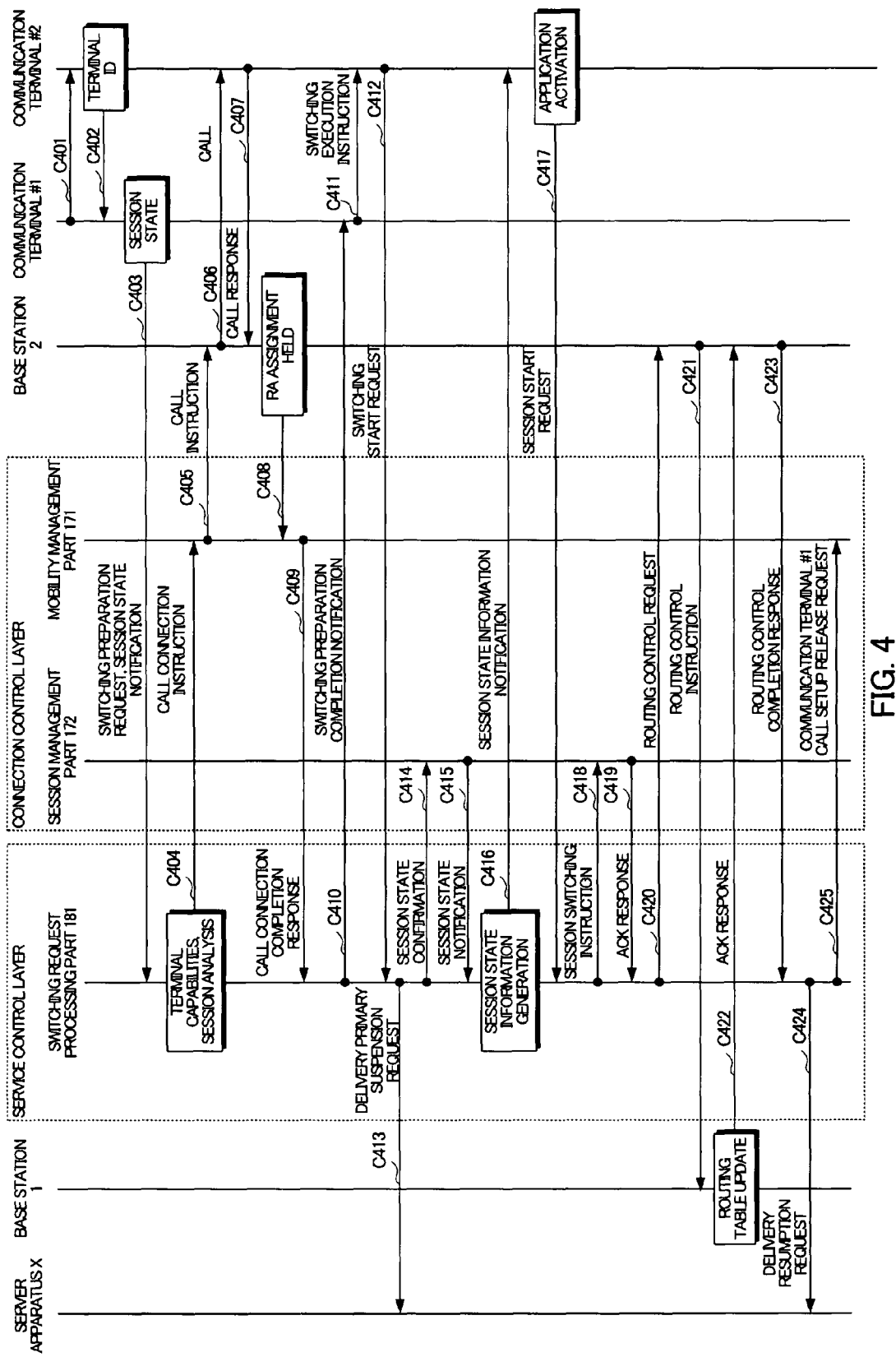
FIG. 4 is a diagram showing a realization procedure for terminal switching by a control of each control layer in the control system of a communication network according to the present embodiment.

FIG. 4 is a diagram showing a realization procedure for terminal switching by a control of each control layer in the control system of a communication network according to the present embodiment. Here, reception of content delivery is exemplified and it is assumed that a call connection and a session have already been established between the server apparatus X, which is a data transmission source, and the communication terminal #1 on the receiving side via a communication network and content data, for example, motion video is being delivered. To switch the session from the communication terminal #1 to the communication terminal #2, which is the switch destination desired by a user, first, as shown by an arrow C401, the user makes a request of terminal switching preparations to the communication terminal #2 by the short range transmission means using a radio communication such as an infrared ray, Bluetooth (registered trademark), and UWB whose realization is regarded as promising in the future, a wire communication such as USB or the like by a button operation or the like of the communication terminal #1 without passing through the communication network.

If session switching is acceptable, the communication terminal #2 uses a terminal ID notification function to return an Ack response including a terminal ID thereof in which information such as a terminal type is contained to the communication terminal #1 similarly using the short range transmission means, as shown by an arrow C402. Here, the terminal ID is an identifier that can uniquely identify each terminal and, in addition to this information, other information such as a terminal class, attributes, and capabilities may be contained. The communication terminal #1 generates session state information including types and formats of received content, browser types, session elapsed time, rates of bits being received, and resolution and sends out the session state information and control information for requesting switching preparations including the terminal ID acquired from the communication terminal #2 in the previous step to the switching request processing part in the service control layer within the communication network by the session state transmission function, as shown by an arrow C403.

The switching request processing part 181 uses the terminal ID analysis function to analyze information contained in the terminal ID to determine whether the communication terminal #2 is a terminal having different kinds of reception capabilities from those of the communication terminal #1 or a terminal having similar capabilities to those of the communication terminal #1 and grasp applications such as browser software that can be installed and used by the communication terminal #2, bit rates that can be processed, and resolution. Further, the session control function is used to analyze whether a session set for the communication terminal #1 can be inherited by the communication terminal #2 based on the session state information. If, as a result of this analysis, the session can be inherited, the switching request processing part 181 first uses the call setup request function to instruct the mobility management part 171 in the connection control layer to set a call connection of the communication terminal #2 to the communication network, as shown by an arrow C404, to put the communication terminal #2 into a call connection state. Like the procedure for setting a call connection described above, the mobility management part 171 uses the call control function to instruct the base station 2 controlling the routing area in which the communication terminal #2 is located to originate a call, as shown by an arrow C405.

A call connection is set when the base station 2 originates a call to the communication terminal #2, as shown by an arrow C406 and the communication terminal #2 responds to the call, as shown by an arrow C407. The base station 2 assigns a routing address corresponding to the host address of the communication terminal #2, holds the routing address in the routing table thereof, and registers the routing address in the mobility management part 171, as shown by an arrow C408. The mobility management part uses the routing control function to accept the routing address registration and further uses the call control function to notify the switching request processing part 181 in the service control layer, which has made a call connection request, of a call connection setting, as shown by an arrow C409.

The switching request processing part 181 uses a switching reception function to notify the communication terminal #1 that switching preparations have been made, as shown by an arrow C410, and the communication terminal #1 similarly uses the short range transmission means to instruct the communication terminal #2 to perform session switching, as shown by an arrow C411. The communication terminal #2 requests the switching request processing part 181 to perform switching, as shown by an arrow C412, and the switching request processing part 181 requests the server apparatus X, which is an opposite party, to temporarily suspend delivery using the delivery suspension/resumption instruction function, as shown by an arrow C413. Steps C410 to C412 are used by the control system of a communication network to notify the communication terminals that preparations for switching have been made for confirmation and may be omitted. If omitted, when preparations for switching have been made, the switching request processing part 181 requests temporary suspension of delivery shown by the arrow C413.

While delivery is temporarily suspended in the above step, the switching request processing part 181 uses the session control function to ask the session management part 172 in the connection control layer to temporarily suspend sessions and, at the same time, to confirm session conditions between the server apparatus X and the communication terminal #1, as shown by an arrow C414, and based on a session elapsed time notified from the session management part 172 as a response shown by an arrow C415, information upon login for using applications, information about content quality, and analysis results of terminal ID of the communication terminal #2 and session state information analyzed in the previous step, generates information necessary for the communication terminal #2 to reproduce the sessions after switching, that is, session state information including application types such as browser, image processing means and the like to notify the communication terminal #2 of the session state information necessary for the communication terminal #2 to set to inherit the transferred sessions, as shown by an arrow C416, and also to notify that the session state information is a request from the communication terminal #1. Steps of C414 and 415 are intended to confirm session state information managed and grasped by the communication network and also to complement session state information acquired from the terminals using the short range transmission means in step C403. Transfer of session state information may be directly performed between communication terminals by the short range transmission means or via the session management part 172 in the communication network.

When, after receiving the session state information, the communication terminal #2 activates necessary applications and sends a response to the switching request processing part 181 to notify that preparations for accepting a switching request have been made, as shown by an arrow C417, the switching request processing part 181 uses the session control function to instruct the session management part 172 in the connection control layer 170 to switch the session between the communication terminal #1 and server apparatus X to that between the communication terminal #2 and server apparatus X, as shown by an arrow C418.

When, after receiving an Ack response from the session management part 172, as shown by an arrow C419, the switching request processing part 181 instructs the mobility management part 171 to perform routing control, as shown by an arrow C420, the mobility management part 171 uses the routing control function to instruct the base station 1, which is a nearby base station of the server apparatus X, to rewrite the routing table, as shown by an arrow C421, to change the transfer path of IP packets addressed to the host address of the communication terminal #1 to that of the communication terminal #2 and when an Ack response is received from the base station 1, as shown by an arrow C422, notifies the switching request processing part 181 that the routing control is completed, as shown by an arrow C423. After performing this procedure, the session connection between the communication terminal #1 and the server apparatus X is released and only a call connection is set.

Because preparations for transferring the session have been made, the switching request processing part 181 uses the delivery suspension/resumption instruction function to request the server apparatus X, which is the delivery source, to resume delivery, as shown by an arrow C424, and when delivery from the server apparatus X is resumed, like the control procedure during handover described above, the host address in the header part of IP packets is rewritten according to the routing table in the base station 1, which is the nearby base station of the server apparatus X, and the IP packets are relayed by each router in the transport layer to transmit data to be continued to the communication terminal #2.

The switching request processing part 181 requests the mobility management part 171 in the connection control layer 170 to release the call connection setting of the communication terminal #1, as shown by an arrow C425, and the mobility management part 171 uses the call control function to perform a control to release the call setup of the communication terminal #1. With steps so far, switching of a session between communication terminals is completed.

Next, a modification of the present embodiment will be described. With a series of steps described above, a smooth switching is realized by exchanging information about switching preparations and switching start using the short range transmission means between the communication terminal #1 of switch source and the communication terminal #2 of switch destination, but the present invention is not limited to this embodiment. Namely, since switching of terminals is realized by each control layer in a communication network through a call setup, routing control, and session setting to the communication terminal #2 of switch destination in the present invention, communication terminals can basically be switched even if communication terminals have no short range transmission means or communication terminals are located so apart from each other that the short range transmission means cannot be used. In such cases, after the communication terminal #1 of the switch source makes a switching request and each control layer performs a call setup, routing control, and session setting, an additional step in which the switching request processing part 181 notifies the communication terminal #2 of switch destination of session transfer from the communication terminal #1 is needed before the session is transferred.

Figure 5:
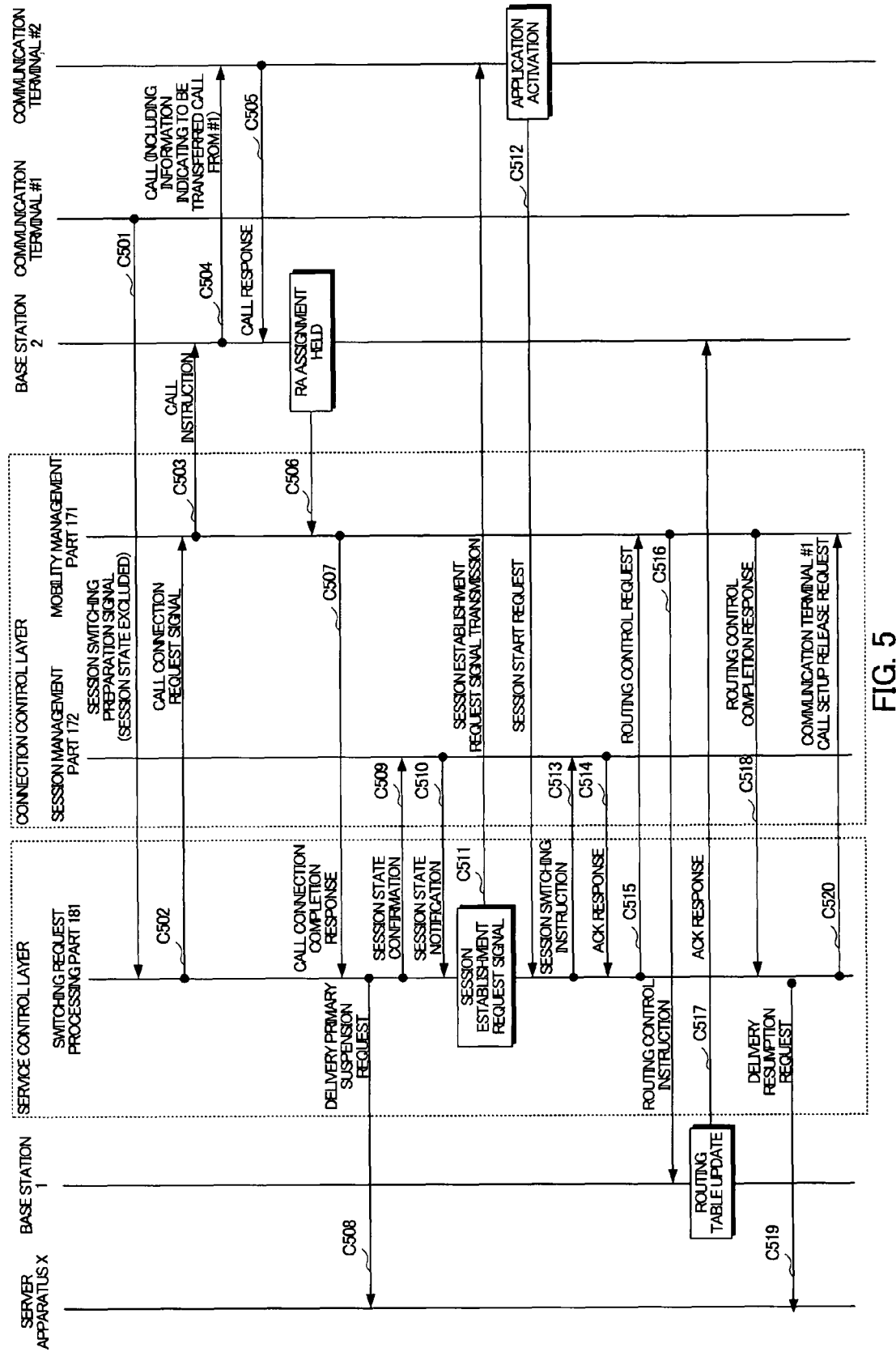
FIG. 5 is a diagram showing the realization procedure for terminal switching by a control of each control layer in a control system of a communication network according to a modification of the present embodiment.
Figure 6:
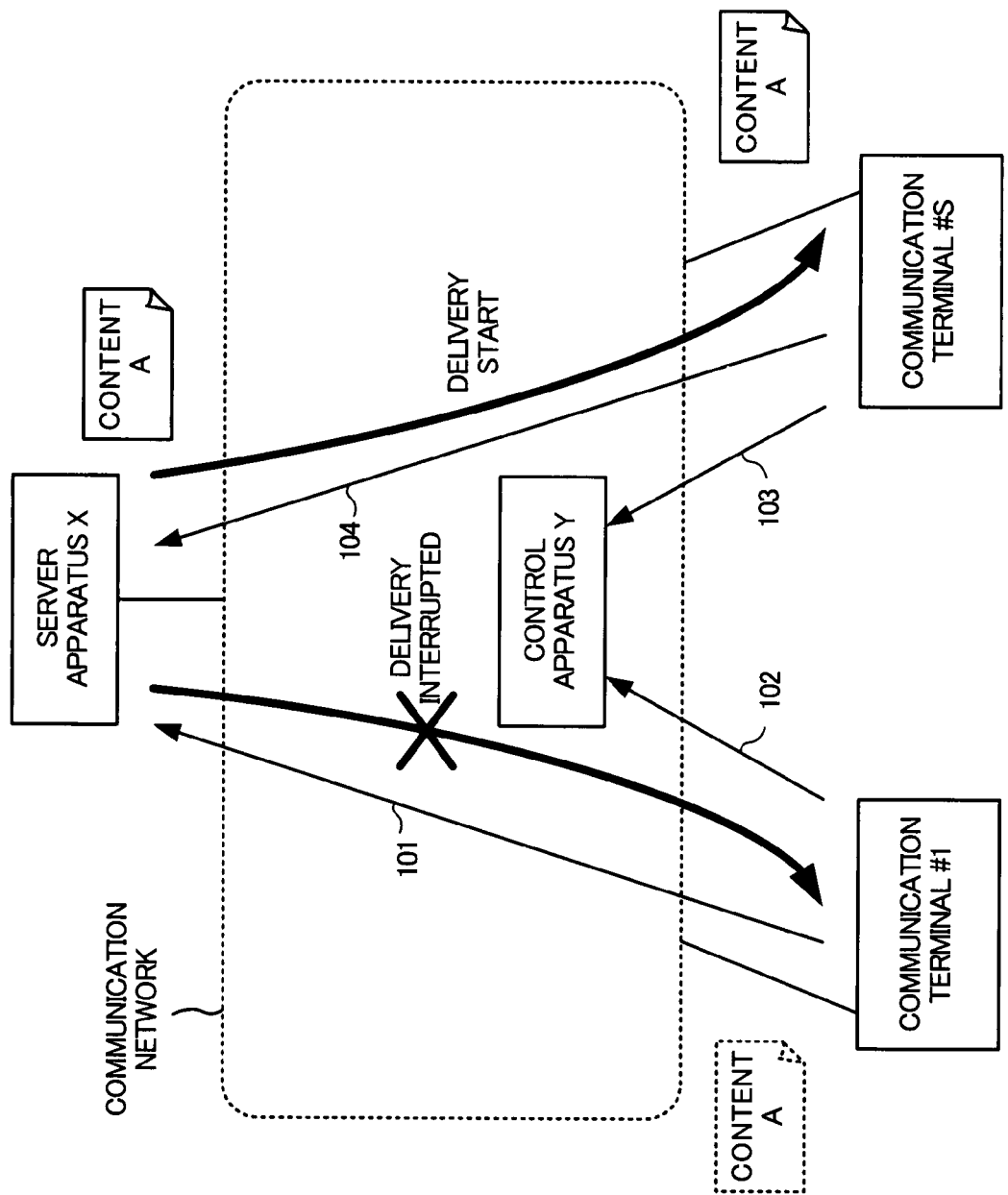
FIG. 6 is a diagram illustrating terminal switching in a control system of a communication network.
Figure 7:
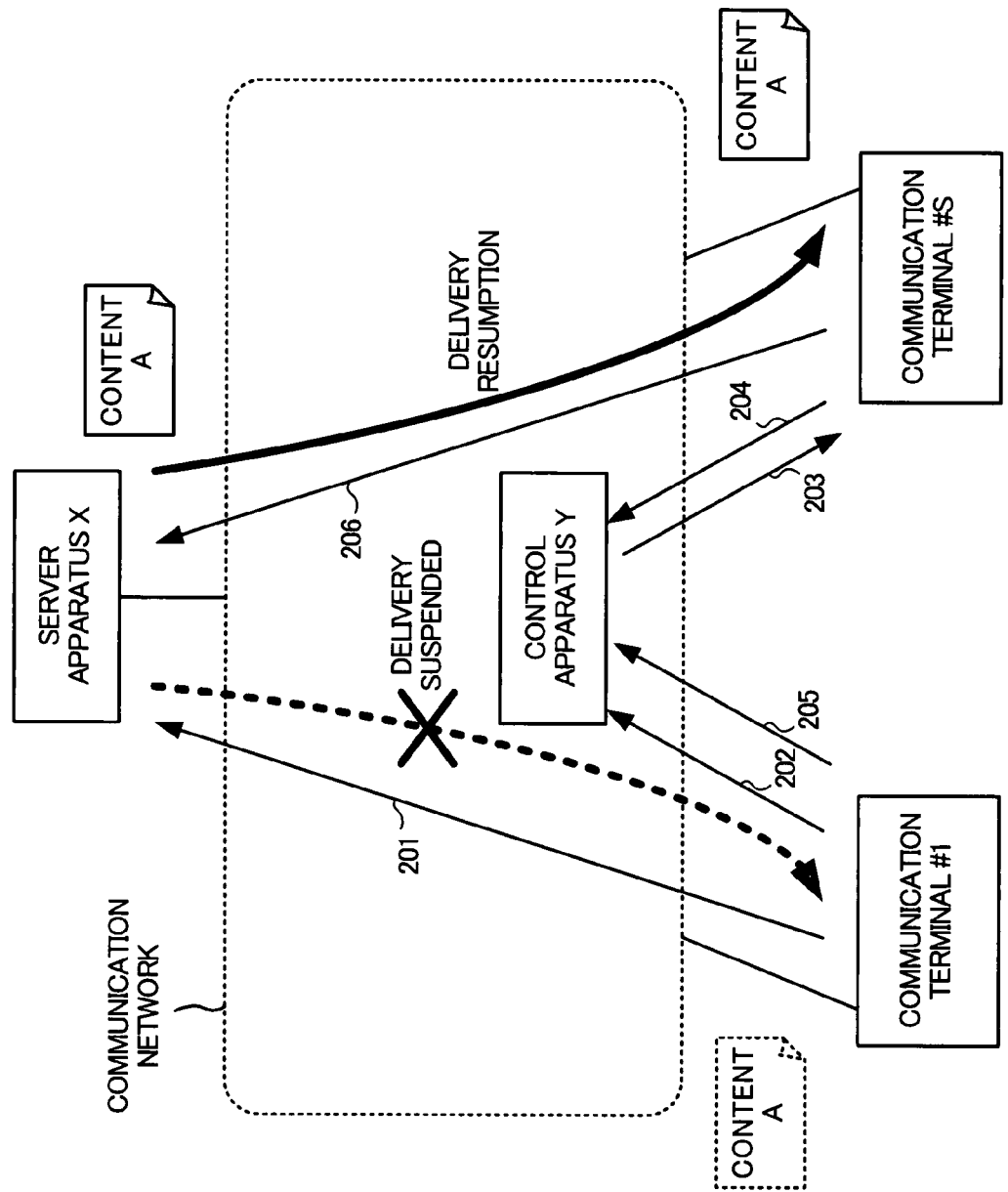
FIG. 7 is a diagram illustrating terminal switching in a control system of a communication network.

FIG. 5 is a diagram showing the realization procedure for terminal switching by a control of each control layer in a control system of a communication network according to a modification of the present embodiment. Here, like the procedure shown in FIG. 4, reception of content delivery will be exemplified. Also, it is assumed that a call connection and a session have already been established between the server apparatus X, which is a data transmission source, and the communication terminal #1 on the receiving side via a communication network and content data, for example, motion video is being delivered.

To switch the session from the communication terminal #1 to the communication terminal #2, which is the switch destination desired by a user, first the user enters the host address of the communication terminal #2 by a button operation of the communication terminal #1 or the like or invokes the host address of the communication terminal #2 stored in the communication terminal #1 in advance and then transmits a session switching request signal including information specifying that the desired switch destination is the communication terminal #2 to the switching request processing part 181 in the communication network, as shown by an arrow C501 in FIG. 5. The session switching request signal may or may not include information representing session states. Next, the switching request processing part 181 instructs the mobility management part 171 in the connection control layer to set a call connection of the communication terminal #2 to the communication network, as shown by an arrow C502. The mobility management part 171 uses the call control function to instruct the base station 2 controlling the routing area in which the communication terminal #2 is located to originate a call, as shown by an arrow C503.

A call connection is set when the base station 2 transmits control information of the call including information indicating to be a transferred call from the communication terminal #1 to the communication terminal #2, as shown by an arrow C504, and the communication terminal #2 responds to the call, as shown by an arrow C505. The base station 2 assigns a routing address corresponding to the host address of the communication terminal #2, holds the routing address in the routing table thereof, and registers the routing address in the mobility management part 171, as shown by an arrow C506. The mobility management part 171 uses the routing control function to accept the routing address registration and further uses the call control function to notify the switching request processing part 181 in the service control layer, which has made a call connection request, of a call connection setting, as shown by an arrow C507. The switching request processing part 181 requests the server apparatus X, which is an opposite party, to temporarily suspend delivery using the delivery suspension/resumption instruction function, as shown by an arrow C508.

While delivery is temporarily suspended in the above step, the switching request processing part 181 uses the session control function to ask the session management part 172 in the connection control layer to temporarily suspend sessions and at the same time, to confirm session conditions between the server apparatus X and the communication terminal #1, as shown by an arrow C509, and based on a session elapsed time notified from the session management part 172 as a response shown by an arrow C510, information upon login for using applications, information about content quality, and analysis results of session state information (session state information when the session switching request signal shown by C501 contains information indicating session states and/or information managed and stored by the session management part 172), transmits information necessary for the communication terminal #2 to reproduce a session after switching. That is, a session establishment request signal including information indicating to be a session transferred from the communication terminal #1 and information about the session before switching, states of applications such as browsers, and history is generated and transmitted to the communication terminal #2, as shown by an arrow C511.

When, after receiving the session establishment request signal, the communication terminal #2 activates necessary applications and sends a response to the switching request processing part 181 to notify that preparations for accepting a switching request have been made, as shown by an arrow C512, the switching request processing part 181 uses the session control function to instruct the session management part 172 in the connection control layer 170 to switch the session between the communication terminal #1 and server apparatus X to that between the communication terminal #2 and server apparatus X, as shown by an arrow C513.

When, after receiving an Ack response from the session management part 172, as shown by an arrow C514, the switching request processing part 181 instructs the mobility management part 171 to perform routing control, as shown by an arrow C515, the mobility management part 171 uses the routing control function to instruct the base station 1, which is a nearby base station of the server apparatus X, to rewrite the routing table, as shown by an arrow C516, to change the transfer path of IP packets addressed to the host address of the communication terminal #1 to that of the communication terminal #2 and when an Ack response is received from the base station 1, as shown by an arrow C517, notifies the switching request processing part 181 that the routing control is completed, as shown by an arrow C518. After performing this procedure, the session connection between the communication terminal #1 and the server apparatus X is released and only a call connection is set.

Because preparations for transferring the session have been made, the switching request processing part 181 uses the delivery suspension/resumption instruction function to request the server apparatus X, which is the delivery source, to resume delivery, as shown by an arrow C519, and when delivery from the server apparatus X is resumed, like the control procedure during handover described above, the host address in the header part of IP packets is rewritten according to the routing table in the base station 1, which is the nearby base station of the server apparatus X, and the IP packets are relayed by each router in the transport layer to transmit data to be continued to the communication terminal #2.

The switching request processing part 181 requests the mobility management part 171 in the connection control layer 170 to release the call connection setting of the communication terminal #1, as shown by an arrow C520, and the mobility management part 171 uses the call control function to perform a control to release the call setup of the communication terminal #1. With steps so far, switching of a session between communication terminals is completed.

Since the call connection request signal (C502) contains information indicating to be a transferred call in the modification of the present embodiment, confirmation of transferring a session by the short range transmission means can be omitted and this makes it possible to switch a session not only when communication terminals have no short range transmission means, but also when the short range transmission means cannot be used, for example, because the communication terminal #1 and the communication terminal #2 are located relatively apart from each other. Namely, this means that the switching means in the present invention is also valid when the user of the communication terminal #1 of the switch source and that of the communication terminal #2 of switch destination are different. Since the control information (C504) of a call in the above case contains information indicating to be a transferred call, the user of the communication terminal #2 can recognize that the transferred call is from (the user of) the communication terminal #1 so that a call connection can be established only after determining whether to accept the transferred call.

If the user does not make a switching request from the communication terminal #1 of the switch source, a case can still be supposed in which the communication network determines that delivery to the communication terminal #2 is preferable and a session is automatically transferred by functions of each control layer of the present invention. More specifically, this is a case if the communication terminal #1 is a mobile communication terminal or the like whose data processing capabilities and transmission resources are restricted to some extent and the communication terminal #2 is a personal computer or the like whose data processing capabilities are higher and independent of transmission resources, and a session is transferred to the communication terminal #2. In this case, addition of a function to determine whether switching is necessary by grasping traffic conditions in a communication network and resource conditions in a transmission portion can be considered in the service control layer of the communication network. Further, addition of a function to set routing control so that content data is transferred after converting the content data into a format suitable for reception capabilities of the communication terminal #2 by arranging a device having a media conversion function that converts the content data format in a communication network and passing the content data through the media conversion device can be supposed.

The above description illustrated an example of content delivery from the server apparatus X, but if an opposite party is a communication terminal equivalent to the communication terminal #1, that is, also for bi-directional and interactive communication like a TV phone, the above procedure can be similarly applied to realize a seamless switching of communication terminals.

As has been described so far, since, in addition to the function to set and manage transmission paths of data in the communication network, the function to manage and control end-to-end sessions, that is, logical transmission paths between applications using transmitted data and the function to transfer the sessions, according to the control system of a communication network in the present embodiment, a smooth and seamless switching of communication terminals including up to state management of sessions and applications can be realized. Also, cooperation with other management and control functions with which the communication network is provided becomes easier and an advanced high-function communication service can thereby be realized more easily, improving extensibility and flexibility.

EXPLANATION OF REFERENCE NUMERALS

10: Control system of a communication network
150: Transport layer
152: Connection control layer
153: Mobility management part
154: Session management part
160: Transport layer
170: Connection control layer
172: Mobility management part
171a: Call control function
171b: Routing control function
172: Session management part
180: Service control layer
181: Switching request processing part
181a: Switching request reception function
181b: Delivery suspension/resumption instruction function
181c: Call setup request function
181d: Session control function
181e: Terminal ID analysis function
181f: Media conversion control function
192: Communication terminal
192a: Call request/response function
192b: Session connection function
192c: Session management function
192d: Short range radio communication part
192e: State setting function

The invention claimed is:

1. A control system of a communication network performing control to continue a communication with a communication terminal of an opposite side without interrupting said communication between communication terminals by switching at least one communication terminal performing said communication to a switch destination communication terminal not performing said communication, wherein the communication to be continued includes a session having a logical data transmission path between opposite side applications of said communication terminals, said control system comprising:
    a processor coupled to:
        a call control part operable to set a physical and logical transmission path between said communication terminals by performing a routing control of data packet transfer in a transport layer to control a call connection;
        a session management part operable to manage establishment of a session between the applications of said communication terminals; and
        a switching request processing unit operable to control said call control part and said session management part, wherein
        said switching request processing unit exercises functions of:
        receiving a session switching request signal from said at least one communication terminal, the session switching request signal including identification information identifying the switch destination communication terminal and session state information including states of applications on said at least one communication terminal;
        instructing and controlling said call control part to originate a call to and establish the call connection with said switch destination communication terminal based on the identification information and the session state information and to set a transmission path between said switch destination communication terminal and said communication terminal of the opposite side, and
        instructing and controlling said session management part to switch the session between applications on the communication terminals to a session between applications on said switch destination communication terminal and said communication terminal of the opposite side after establishment of said call connection by said call control part.

2. The control system of the communication network according to claim 1, wherein said switching request processing unit includes a determination part determining whether or not to switch said at least one of communication terminals performing the communication to said switch destination communication terminal not performing said communication based on traffic conditions in said communication network or resource conditions in a transmission portion.

3. The communication terminal provided as the at least one communication terminal associated with the control system of the communication network according to claim 1, comprising:
    a processor coupled to:
        a terminal call connection part operable to process a call connection to the communication terminal of the opposite side with said control system of the communication network; and
        a terminal session connection part operable to process a setting of a session with an application on the communication terminal of the opposite side with said control system of the communication network, wherein
        said terminal session connection part transmits a session switching request signal to the switching request processing part of said control system of the communication network when switching a communication to said switch destination communication terminal without interrupting said communication with the communication terminal of the opposite side.

4. The communication terminal according to claim 3, further comprising a terminal short range transmission system for transmitting a session switching instruction signal to said switch destination communication terminal without passing through said communication network, wherein said communication terminal transmits said session switching instruction signal using said short range transmission system and transmits, after receiving a response signal from said switch destination communication terminal, said session switching request signal when switching to said switch destination communication terminal not performing said communication without interrupting said communication with the communication terminal of the opposite side.

5. The communication terminal provided as the at least one communication terminal associated with the control system of the communication network according to claim 1, comprising:
    a processor coupled to:
        a terminal call connection part operable to process a call connection with the communication terminal of the opposite side with said control system of the communication network;
        a terminal session connection part operable to process a setting of a session with an application on the communication terminal of the opposite side with said control system of the communication network, and
        a state setting part operable to receive session state information representing states of sessions and applications to set states of sessions and applications on an own communication terminal, wherein
        said call connection part, when receiving a call connection request signal including information indicating a call to be transferred from said control system of the communication network, or said terminal session connection part, when receiving a session establishment request signal including information indicating a session to be transferred from said control system of the communication network, determine that the communication performed by said communication terminal before switching has been switched to the own communication terminal to accept and respond to said call connection request signal and said session establishment request signal respectively, and at the same time said state setting means sets states of sessions and applications.

6. The communication terminal provided as the at least one communication terminal associated with the control system of the communication network according to claim 1, comprising:
    a processor coupled to:
        a terminal call connection part operable to process a call connection with the communication terminal of the opposite side with said control system of the communication network;
        a terminal session connection part operable to process a setting of the session with an application on the communication terminal of the opposite side with said control system of the communication network;
        a terminal state setting part operable to receive session state information representing states of sessions and applications to set states of sessions and applications on an own communication terminal; and a short range transmission system operable to receive a session switching instruction signal from another communication terminal without passing through said communication network, wherein when said short range transmission system receives said session switching instruction signal, said terminal call connection part receives a call connection request signal from said control system of the communication network and said terminal session connection part receives a session establishment request signal from said control system of the communication network, and said terminal call connection part and said session connection part determine that the communication performed by said communication terminal before switching has been switched to the own communication terminal to accept and respond to said call connection request signal and said session establishment request signal respectively, and said terminal state setting part sets states of sessions and applications.

7. The control system of the communication network according to claim 1, wherein a user of a communication terminal performing said communication and a user of a communication terminal not performing said communication are different.

8. A control system of a communication network performing control to continue a communication with a communication terminal of an opposite side without interrupting said communication between communication terminals by switching at least one communication terminal performing said communication to a switch destination communication terminal not performing said communication, wherein the communication to be continued includes a session having a logical data transmission path between opposite side applications of said communication terminals, said control system comprising:

a processor coupled to:

a call control part operable to set a physical and logical transmission path between said communication terminals by performing a routing control of data packet transfer in a transport layer to control a call connection;

a session management part operable to manage establishment of a session between the applications of said communication terminals; and a switching request processing unit operable to control said call control part and said session management part, wherein said switching request processing unit exercises functions of:

receiving a session switching request signal from said at least one communication terminal, the session switching request signal including identification information identifying the switch destination communication terminal and session state information including states of applications on said at least one communication terminal;

instructing and controlling said call control part to originate a call to and establish the call connection with said switch destination communication terminal based on the identification information and the session state information and to set a transmission path between said switch destination communication terminal and said communication terminal of the opposite side, and instructing and controlling said session management part to switch the session between applications on the communication terminals to a session between applications on said switch destination communication terminal and said communication terminal of the opposite side after establishment of said call connection by said call control part, and wherein said switching request processing unit receives said session switching request signal including a type, attributes, processing and terminal capability information including at least any of available bit rates, media type, and codec type of said switch destination communication terminal, and instructs and controls said call control part and said session management part respectively to set the transmission path and switch to the session in accordance with said received terminal capability information.

9. The control system of the communication network according to claim 8, wherein said switching request processing unit includes a media conversion control unit that controls, when said at least one communication terminal performing the communication is switched to said switch destination communication terminal not performing said communication, conversion of a format of content data into another format adapted to reception capabilities of the switch destination communication terminal, wherein a function to instruct said call control part to set transmission path adapted to a content data format after said format conversion is exercised.

10. A control system of a communication network performing control to continue a communication with a communication terminal of an opposite side without interrupting said communication between communication terminals by switching at least one communication terminal performing said communication to a switch destination communication terminal not performing said communication, wherein the communication to be continued includes a session having a logical data transmission path between opposite side applications of said communication terminals, said control system comprising:

a processor coupled to:

a call control part operable to set a physical and logical transmission path between said communication terminals by performing a routing control of data packet transfer in a transport layer to control a call connection;

a session management part operable to manage establishment of a session between the applications of said communication terminals; and a switching request processing unit operable to control said call control part and said session management part, wherein said switching request processing unit exercises functions of:

receiving a session switching request signal from said at least one communication terminal, the session switching request signal including identification information identifying the switch destination communication terminal and session state information including states of applications on said at least one communication terminal;

instructing and controlling said call control part to originate a call to and establish the call connection with said switch destination communication terminal based on the identification information and the session state information and to set a transmission path between said switch destination communication terminal and said communication terminal of the opposite side, and instructing and controlling said session management part to switch the session between applications on the communication terminals to a session between applications on said switch destination communication terminal and said communication terminal of the opposite side after establishment of said call connection by said call control part, and wherein said switching request processing unit receives said session switching request signal including data transmission history of said at least one communication terminal or session state information including states of applications on said at least one communication terminal, and exercises a function to notify the switch destination communication terminal of said session state information.

11. A control system of a communication network performing control to continue a communication with a communication terminal of an opposite side without interrupting said communication between communication terminals by switching at least one communication terminal performing said communication to a switch destination communication terminal not performing said communication, wherein the communication to be continued includes a session having a logical data transmission path between opposite side applications of said communication terminals, said control system comprising:

a processor coupled to:
a call control part operable to set a physical and logical transmission path between said communication terminals by performing a routing control of data packet transfer in a transport layer to control a call connection;

a session management part operable to manage establishment of a session between the applications of said communication terminals; and a switching request processing unit operable to control said call control part and said session management part, wherein said switching request processing unit exercises functions of:

receiving a session switching request signal from said at least one communication terminal, the session switching request signal including identification information identifying the switch destination communication terminal and session state information including states of applications on said at least one communication terminal;

instructing and controlling said call control part to originate a call to and establish the call connection with said switch destination communication terminal based on the identification information and the session state information and to set a transmission path between said switch destination communication terminal and said communication terminal of the opposite side, and instructing and controlling said session management part to switch the session between applications on the communication terminals to a session between applications on said switch destination communication terminal and said communication terminal of the opposite side after establishment of said call connection by said call control part, and wherein said session management part exercises a session state storage function to manage/store data transmission history and session state information including states of applications on the communication terminals, and said switching request processing unit exercises a function to read said session state information from said session management part and a function to notify the switch destination communication terminal of said session state information.

12. A control method of a communication network performing control to continue a communication with a communication terminal of an opposite side without interrupting said communication between communication terminals by switching at least one communication terminal performing the communication to a switch destination communication terminal not performing said communication using a control system of a communication network having: a call control part to perform a routing control of data packet transfer in a transport layer and setting a physical and logical transmission path between said communication terminals to control a call connection; a session management part operable to manage establishment of a session having a logical data transmission path between opposite side applications of said communication terminals, said session being established between said opposite side applications of said communication terminals; and a switching request processing unit operable to control said call control part and said session management part, said control method comprising:

a step in which said at least one communication terminal performing said communication with said communication terminal of the opposite side transmits a session switching instruction signal to a switch destination communication terminal not performing said communication using a short range transmission system that does not pass through said communication network;

a step in which the at least one communication terminal that transmitted said session switching instruction signal transmits a session switching request signal to said switching request processing unit after receiving a response signal from said switch destination communication terminal, the session switching request signal including identification information identifying the switch destination communication terminal and session state information including states of applications on said at least one communication terminal;

a step in which said switching request processing unit instructs said call control part to originate a call to and establish a call connection with the switch destination communication terminal based on the identification information and the session state information and to set a transmission path between said switch destination communication terminal and said communication terminal of the opposite side; and a step in which the at least one communication terminal that transmitted said session switching instruction signal instructs said session management part from said switching request processing unit to switch a session between applications on the at least one communication terminal and the communication terminal of the opposite side to a session between applications on said switch destination communication terminal and the communication terminal of the opposite side.

13. The control method of the communication network according to claim 12, wherein the session switching instruction signal to be transmitted using said short range transmission system is transmitted by including information on sessions, states of applications and history thereof in said at least one communication terminal.

14. The control method of the communication network according to claim 12, wherein said at least one communication terminal transmits said session switching request signal by including data transmission history of said at least one communication terminal or session state information including states of applications on said at least one communication terminal, and further includes a step in which said switching request processing unit notifies the switch destination communication terminal of said session state information.

15. The control method of the communication network according to claim 12, wherein said session management part further comprises a function to manage and store data transmission history and session state information including states of applications on the communication terminals, and said switching request processing unit further comprises the steps of reading said session state information from said session management part and notifying the switch destination communication terminal of said session state information.

16. A control method of a communication network performing control to continue a communication with a communication terminal of an opposite side without interrupting said communication between communication terminals by switching at least one communication terminal performing the communication to a switch destination communication terminal not performing said communication using a control system of the communication network having: a call control part operable to perform a routing control of data packet transfer in a transport layer and setting a physical and logical transmission path between said communication terminals to control a call connection; a session management part operable to manage establishment of a session having a logical data transmission path between opposite side applications of said communication terminals, said session being established between said opposite side applications of said communication terminals; said session being established between said opposite side applications of said communication terminals; and a switching request processing unit operable to control said call control part and said session management part, said control method comprising:

- a step in which said at least one communication terminal performing said communication transmits a session switching request to said switching request processing unit, the session switching request including identification information identifying the switch destination communication terminal and session state information including states of applications on said at least one communication terminal;
- a step in which said switching request processing unit instructs said call control part to originate a call to and establish a call connection with said switch destination communication terminal based on the identification information and the session state information and to set a transmission path between said switch destination communication terminal and said communication terminal of the opposite side;
- a step in which said call control part transmits a call connection request signal including information indicating a call to be transferred from said at least one communication terminal before switching to establish the call connection with said switch destination communication terminal;
- a step in which said switching request processing unit instructs said session management part to switch a session between applications on the at least one communication terminal and the communication terminal of the opposite side to a session between applications on said switch destination communication terminal and said communication terminal of the opposite side; and
- a step in which said call control part transmits a session establishment request signal including information indicating a session to be transferred from said at least one communication terminal before switching.

* * * * *